United States Patent
Funk et al.

(10) Patent No.: US 7,358,440 B1
(45) Date of Patent: Apr. 15, 2008

(54) RAIN SHIELDED BOX FOR EXITING THROUGH SIDING

(75) Inventors: Anthony Isaac Funk, 5863 188A Street, Surrey, BC (CA) V3S 7T3; Robert Anthony Funk, Surrey (CA)

(73) Assignees: Anthony Isaac Funk, Surrey (CA); Sandra Funk, Surrey (CA)

( * ) Notice: Subject to any disclaimer, the term of this patent is extended or adjusted under 35 U.S.C. 154(b) by 0 days.

(21) Appl. No.: 11/676,144

(22) Filed: Feb. 16, 2007

(51) Int. Cl.
*H01H 9/02* (2006.01)

(52) U.S. Cl. .................... 174/58; 174/50; 174/60; 174/64; 248/906; 439/535

(58) Field of Classification Search ........... 174/50, 174/17 VA, 48, 135, 17 CT, 60, 63, 64, 58; 220/3.8, 4.02, 3.2; 248/906; 439/535; 285/149.1; 361/826
See application file for complete search history.

(56) References Cited

U.S. PATENT DOCUMENTS

| | | | | |
|---|---|---|---|---|
| 4,247,738 A | * | 1/1981 | Bonato | 174/53 |
| 5,959,243 A | * | 9/1999 | Thiel | 174/17 CT |
| 6,166,327 A | * | 12/2000 | Saito et al. | 174/50 |
| 6,239,365 B1 | * | 5/2001 | McEvers | 174/50 |
| 6,433,275 B1 | * | 8/2002 | Rittmann et al. | 174/50.56 |
| 6,504,719 B2 | * | 1/2003 | Konstad et al. | 361/698 |
| 6,768,054 B2 | * | 7/2004 | Sato et al. | 174/50 |
| 7,105,745 B2 | * | 9/2006 | Drane et al. | 174/67 |
| 7,166,800 B2 | * | 1/2007 | Shaw et al. | 174/50 |
| 7,179,990 B2 | * | 2/2007 | Kanazawa | 174/50 |

* cited by examiner

*Primary Examiner*—Dhiru R. Patel
(74) *Attorney, Agent, or Firm*—Vermette & Co.

(57) ABSTRACT

A mounting box for installation on an exterior wall of a building. The mounting box has a box-shaped structure having a substantially horizontally disposed top surface when in situ, a nailing flange around a perimeter of the box-shaped structure, a downwardly and outwardly inclined shoulder on each side of the top surface, the shoulders each having a shoulder surface and a plurality of notches along an outer edge of the shoulder surface which attract and constrain the flow of water along the shoulders.

14 Claims, 3 Drawing Sheets

RAIN SHIELDED BOX FOR EXITING THROUGH SIDING

FIELD

The present invention relates to rain shielded mounting boxes used to pass through siding clad building walls and provide access from the outside to such things as dryer outlets, electrical receptacles, light fixtures, gable vents, wall vents, water taps, soffit vents, etc.

BACKGROUND

In installing electrical fixtures, receptacles, lights and the like on the exterior of a building wall, it is necessary to provide a means of preventing rain from entering into the wall past the siding. Typically, various central boxes are used which are designed to shield against the entry of rain. The mounting box has a perimeter nailing strip which has nail holes to allow nailing of the mounting box to the surface of the sheathing covering the outside of the wall. The mounting box extends outwardly from the nailing strip and exterior cladding or siding is placed over the nailing strip abutting the mounting box. A cover plate snaps over the mounting box abutting the siding. The mounting box deflects water to the sides but prior devices had no reliable way of diverting the water flowing to the sides down the vertical sides of the mounting box and off of a drip plate extending across the bottom. Water enters between the cladding and the sheathing where it can cause damage to the structural framework of the building. Even in systems such as that described in U.S. Pat. No. 6,951,081 issued to Bonshor which provides vertical channels formed between spaced apart flanges located on either side of the mounting box for the water to run down, water will still flow around the flange and into the region between the sheathing and the cladding.

U.S. Pat. No. 5,303,522 issued to Vagedes discloses a tab extending from partway down the nailing strip at an inclined angle towards an outside flange. Any water getting into the channel is supposed to run along the tab and away from the building wall to an exterior surface of the siding. The problem with Vagedes is that there is nothing to divert the water flowing to the sides along the top of the mounting box down to the tab. As a result water flowing to the sides enters the region between the sheathing and the cladding almost unimpeded.

Accordingly, it is an object of the invention to provide a water deflection system for a mounting box that constrains all of the water flowing onto a mounting box so that it flows down each side channel adjacent to the mounting box without into the region between the sheathing and the cladding.

SUMMARY OF THE INVENTION

According to the invention there is provided a mounting box for installation on an exterior wall of a building. The mounting box has a box-shaped structure having a substantially horizontally disposed top surface when in situ, a nailing flange around a perimeter of the box-shaped structure, a downwardly and outwardly inclined shoulder on each side of the top surface, the shoulders each having a shoulder surface and a plurality of notches along an outer edge of the shoulder surface.

Preferably, a water diverting flange extends from side to side across the top surface spaced away from the nailing flange.

Advantageously, a rain drip flange extends across a bottom surface of the box-shaped structure having an outer surface continuous with the shoulder surfaces.

A cover plate has an opening to enable engagement of the box structure and a lock to constrain the cover from separation from the box structure.

Protuberances may be located on the inside of the opening of the cover and corresponding indents in top and bottom surfaces of the box structure engageable with the protuberances.

The cover plate may have a flange around its periphery and the separation of the cover plate flange and the nailing flange can be changed by reversing the side of the cover plate flange that faces the nailing flange

BRIEF DESCRIPTION OF THE DRAWINGS

Further features and advantages will be apparent from the following detailed description, given by way of example, of a preferred embodiment taken in conjunction with the accompanying drawings, wherein.

DETAILED DESCRIPTION WITH REFERENCE TO THE DRAWINGS

Figure 3:
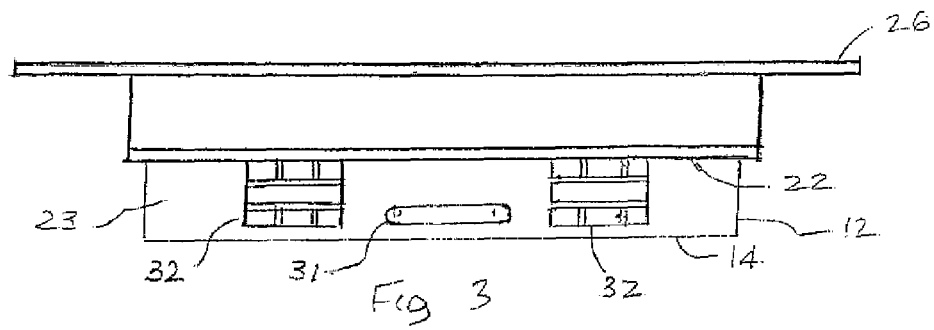
FIG. 3 is a bottom view of the mounting box
Figure 1:
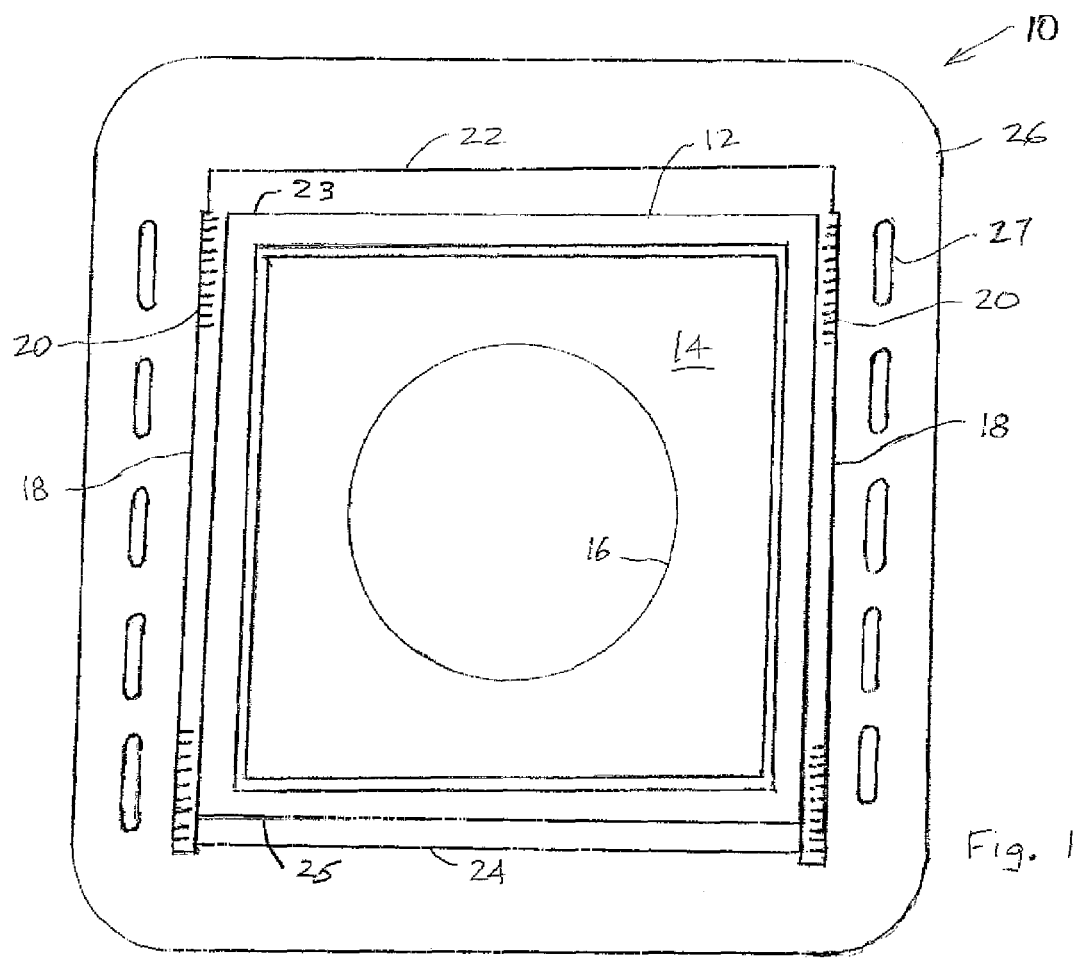
FIG. 1 is a front elevation view of the mounting box.
Figure 2:
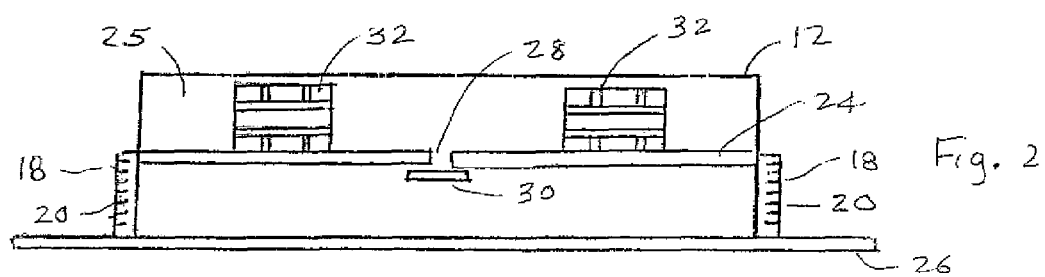
FIG. 2 is a top view of the mounting box.
Figure 4:
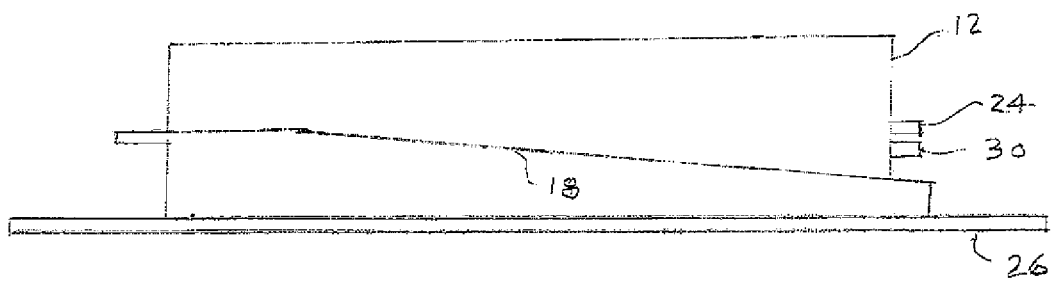
FIG. 4 is a side view of the mounting box.

FIGS. 1-4 show a mounting box 10 for a dryer vent having a central round opening within the front face of a protruding rectangular box-shaped structure 12. While a dryer vent box has shown, the mounting box could be any one of a number of mounting boxes such as an electrical plug receptacle, a light fixture, a water tap receptacle, etc. A large rectangular nailing flange 26 is attached to a wall contacting end of said box-shaped structure 12. The nailing flange 26 runs around the perimeter of said box-shaped structure 12 and has recessed areas of reduced thickness for nails 27 along two opposed sides which are mounted vertically against an outside wall sheathing (not shown). Water diverting runs along the top surface 25 of the box-shaped structure 12 down the center thereof as shown more clearly in FIG. 2. Flange 24 has a gap 28 in the center. Spaced away from the gap 28 a short distance is a slightly arcuate barrier 30 which serves to deflect water that hits the nailing flange 26 along the top and splashes back towards the flange 24. A flange 24 runs along the bottom surface 23 along the center thereof as seen in FIG. 3. In the top and bottom walls of the box-shaped structure 12 there are recesses 32 (see FIG. 2) which serve to engage protuberances 40 and 42 (see FIG. 5). Each recess 32 has three longitudinally extending slots with the outer slots having two ridges slightly recessed below the surface of the box. A rain drip flange 22 extends across the bottom surface of the box-shaped structure 12.

A moisture drain 31 is formed in the bottom surface 23 and serves to allow moisture that has penetrated into the interior of the box-shaped structure 12, for example, via an accessory such as a light bulb, to escape to the exterior of the box-shaped structure 12.

Figure 5:
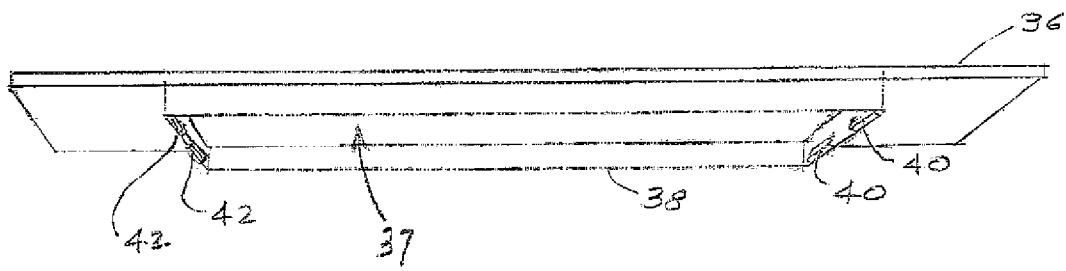
FIG. 5 is a perspective view of the cover.
Figure 6:
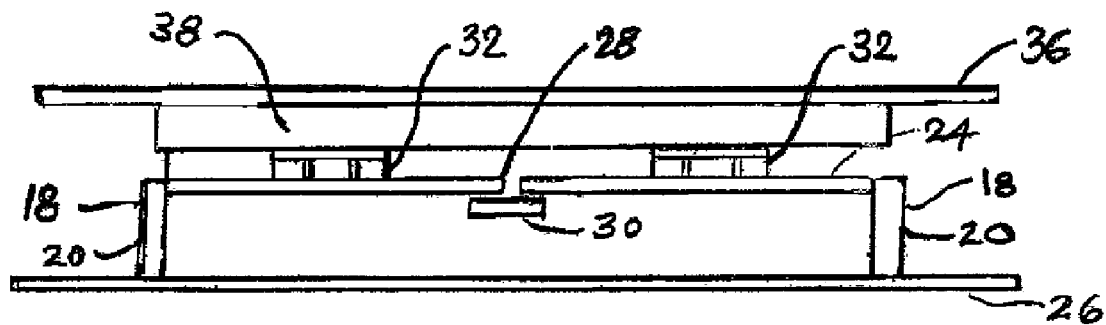
FIG. 6 is an end view of the box-shaped structure and cover plate engaged with a rectangular flange on the cover plate facing the box-shaped structure.
Figure 7:
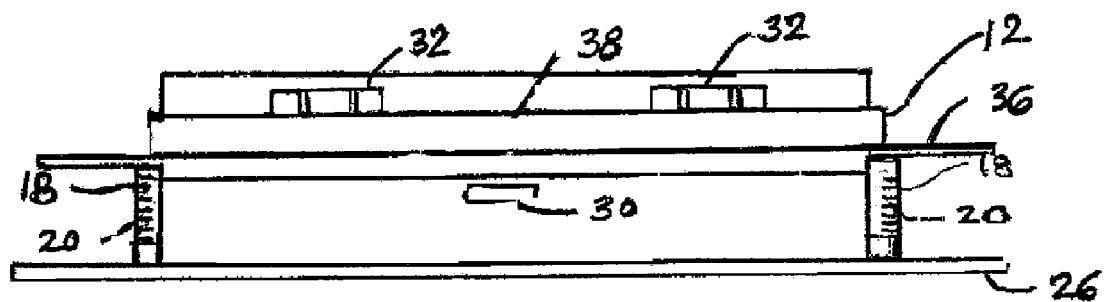
FIG. 7 is an end view of the box-shaped structure and cover plate engaged with the rectangular flange on the cover plate facing outwardly of the box-shaped structure.

Referring to FIGS. 5, 6, and 7, there is shown a cover plate 36 that fits over and locks to box-shaped structure 12. Cover plate 36 has a rectangular opening 37 which is bounded by a rectangular flange 38. On the interior of the rectangular flange 38 there are four protuberances 40 and 42; two on the top of flange 38 and two on the bottom with one at either end of the top and bottom flange walls (see FIG. 5). The locking process involves protuberances 40 and 42 being forced over the edge of the recesses 32 and entering a central slot of each recess 32 to lock the cover plate 36 to the box-shaped structure 12. With flange 38 facing the box-shaped structure 12, the protuberances 40 and 42 engage the central slot providing a first position for the cover in which the nailing flange and the cover plate 36 have the narrowest separation. Reversing the cover plate 36 and pushing together the cover plate 36 and the box-shaped structure 12 causes the protuberances 40 and 42 to enter the central slot giving the widest separation between the nailing flange 26 and the cover plate 36. Typically, the smallest separation between the nailing flange 26 and the cover plate 36 is ⅝ inches. By reversing the cover plate 36 the separation increases, typically, to 1¼ inches. In this way the separation of the nailing flange 26 and the cover plate 36 can be varied to accommodate siding of different thicknesses.

Once the mounting box 10 is installed, water running down the siding falls onto a top surface of the box-shaped structure 12. The water then splashes onto flanges 24 and 26 and moves generally towards the two sides. Shoulders 18 have a plurality of spaced apart notches or grooves 20 spaced along a length thereof near an outer edge of each surface of shoulder 18. Water so constrained to move towards the two sides, contacts notches 20 of shoulders 18. Upon contacting the notches 20, the water is immediately bound to the surfaces of the shoulder 18 by surface tension and flows down those surfaces to a rain drip flange 22. From the rain drip flange 22 water drips harmlessly onto an exterior of the siding. Notches 20 are only about ⅟₁₆ to ⅟₃₂ inches in length and are spaced only about ⅟₃₂ inch apart. It has been found that the notched surfaces intercept almost 100% of the rain that reaches the notched surfaces, providing complete rain shielding protection.

Accordingly while this invention has been described with reference to illustrative embodiments, this description is not intended to be construed in a limiting sense. Various modifications of the illustrative embodiment will be apparent to those skilled in the art upon reference to this description. It is therefore contemplated that appended claims will cover any such modifications or embodiments as fall within the scope of the invention.

We claim:

1. A mounting box for installation on an exterior wall of a building, comprising:
    (a) a box-shaped structure having a substantially horizontally disposed top surface when in situ;
    (b) a nailing flange extending around a perimeter of said box-shaped structure; and
    (c) a plurality of shoulders downwardly and outwardly inclined relative to said nailing flange, starting on each side of said top surface, each of said shoulders having a shoulder surface and a plurality of notches along an outer edge of said shoulder surface;
    (d) a cover plate having an opening to enable engagement of said box-shaped structure and a lock to constrain said cover from separation from said box-shaped structure.

2. The mounting box according to claim 1, including a water diverting flange extending from side to side across the top surface spaced apart from said nailing flange.

3. The mounting box according to claim 1, including a rain drip flange extending across a bottom surface of said box-shaped structure having an outer surface continuous with said shoulder surfaces.

4. The mounting box according to claim 1, including protuberances on the inside of the opening of said cover and corresponding indents in said top surface and a bottom surface of said box-shaped structure engageable with said protuberances.

5. The mounting box according to claim 1, wherein said cover plate has a flange around its periphery and the separation of the cover plate flange and the nailing flange can be changed by reversing the side of the cover plate flange that faces the nailing flange.

6. The mounting box according to claim 1, wherein a bottom surface of said box-shaped structure has an opening which allows moisture penetrating into an interior of said box-shaped structure to escape.

7. A mounting box providing a rain shielded mounting to an exterior wall of a building, comprising:
    (a) a box-shaped structure having a top surface and a bottom surface and side surfaces;
    (b) a nailing flange extending around and affixed to a perimeter of said box-shaped structure at one end thereof and attachable to sheathing of an exterior wall;
    (c) a water diverting flange extending from side-to-side across the top surface spaced away from said nailing flange;
    (d) a plurality of inclined shoulders extending along each side surface from the top surface to the bottom surface of said box-shaped structure, said inclined shoulder proximate said nailing flange at a top surface of each of said shoulders and having a downwardly and outwardly inclined surface with grooves along an outer edge thereof;
    (e) a rain drip flange extending across the bottom surface of said box-shaped structure having an outer surface continuous with the inclined surfaces of said inclined shoulders;
    (f) a cover plate having an opening dimensioned to receive said box-shaped structure and a cover plate flange extending around said opening; and
    (g) locking means for releasably locking together said cover plate and said box-shaped structure said locking means includes two spaced apart recesses in each of said top and bottom surfaces of said box-shaped structure and corresponding protuberances in said cover plate flange positioned to engage said recesses and lock together said cover plate and said box-shaped structure.

8. The mounting box according to claim 7, wherein said cover plate is reversibly engageable with said box-shaped structure so as to change the separation between the flange around a periphery of said cover plate and the nailing flange.

9. A mounting box providing a rain shielded mounting to an exterior wall of a building, comprising:
    (a) a box-shaped structure having a top surface and a bottom surface and side surfaces;
    (b) a nailing flange extending around and affixed to a perimeter of said box-shaped structure at one end thereof and attachable to sheathing of an exterior wall;
    (c) a water diverting flange extending from side to side across the top surface spaced away from said nailing flange;

(d) a plurality of inclined shoulders extending along each side surface from the top surface to the bottom surface of said box-shaped structure, each of said inclined shoulders having an inclined surface with grooves along an outer edge thereof;

(e) a rain drip flange extending across the bottom surface of said box-shaped structure from one inclined surface to another;

(f) a cover plate having a cover plate flange extending around said opening and an opening dimensioned to receive said box-shaped structure and wherein said cover plate can be reversed to change the separation of the cover plate flange and the nailing flange; and (g) locking means for releasably locking together said cover plate and said box-shaped structure.

10. The mounting box according to claim 9, including recessed areas of reduced thickness for nails along at least two sides of said nailing flange.

11. The mounting box according to claim 9, including a gap midway in said water diverting flange and an arcuate flange adjacent the gap in said water diverting flange positioned to block water flow through said gap.

12. The mounting box according to claim 9, wherein the inclined shoulder extends above said top surface.

13. The mounting box according to claim 9, wherein said locking means includes two spaced apart recesses in each of said top and bottom surfaces of said box-shaped structure and corresponding protuberances in said cover plate flange positioned to engage said recesses and lock together said cover plate and said box-shaped structure.

14. The mounting box according to claim 9, wherein the bottom surface of said box-shaped structure has an opening which allows moisture penetrating into an interior of said box-shaped structure to escape

* * * * *